United States Patent
Asa (10) Patent No.: US 9,736,084 B2
(45) Date of Patent: Aug. 15, 2017

(54) COMMAND INJECTION TO HARDWARE PIPELINE FOR ATOMIC CONFIGURATION

(71) Applicant: AVAGO TECHNOLOGIES GENERAL IP (SINGAPORE) PTE. LTD., Singapore (SG)

(72) Inventor: Michael Asa, Kfar Saba (IL)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 251 days.

(21) Appl. No.: 14/538,985

(22) Filed: Nov. 12, 2014

(65) Prior Publication Data
US 2016/0127275 A1 May 5, 2016

Related U.S. Application Data

(60) Provisional application No. 62/074,744, filed on Nov. 4, 2014.

(51) Int. Cl.
*H04L 12/933* (2013.01)
*H04L 29/06* (2006.01)
*H04L 12/935* (2013.01)

(52) U.S. Cl.
CPC .......... *H04L 49/1546* (2013.01); *H04L 69/00* (2013.01); *H04L 49/3063* (2013.01)

(58) Field of Classification Search
CPC .. H04L 69/00; H04L 49/3063; H04L 49/1546
See application file for complete search history.

(56) References Cited

U.S. PATENT DOCUMENTS

5,872,910 A   2/1999 Kuslak et al.
6,412,062 B1  6/2002 Xu et al.

*Primary Examiner* — Robert M Morlan
*Assistant Examiner* — Kevin Lee
(74) *Attorney, Agent, or Firm* — Oblon, McClelland, Maier & Neustadt, L.L.P.

(57) ABSTRACT

A command processing system facilitates pipeline configuration. Each stage of a packet processing pipeline may access certain memory locations for processing of a data packet as it passes through each stage. The command processing system facilitates changing the memory locations in an atomic manner.

20 Claims, 6 Drawing Sheets

COMMAND INJECTION TO HARDWARE PIPELINE FOR ATOMIC CONFIGURATION

PRIORITY CLAIM

This application claims priority to provisional application Ser. No. 62/074,744, filed Nov. 4, 2014, which is entirely incorporated by reference.

TECHNICAL FIELD

This disclosure relates to packet processing. This disclosure also relates to configuration of packet processing pipelines.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in the packet processing pipeline, will further enhance performance of data networks.

DETAILED DESCRIPTION

Figure 1:
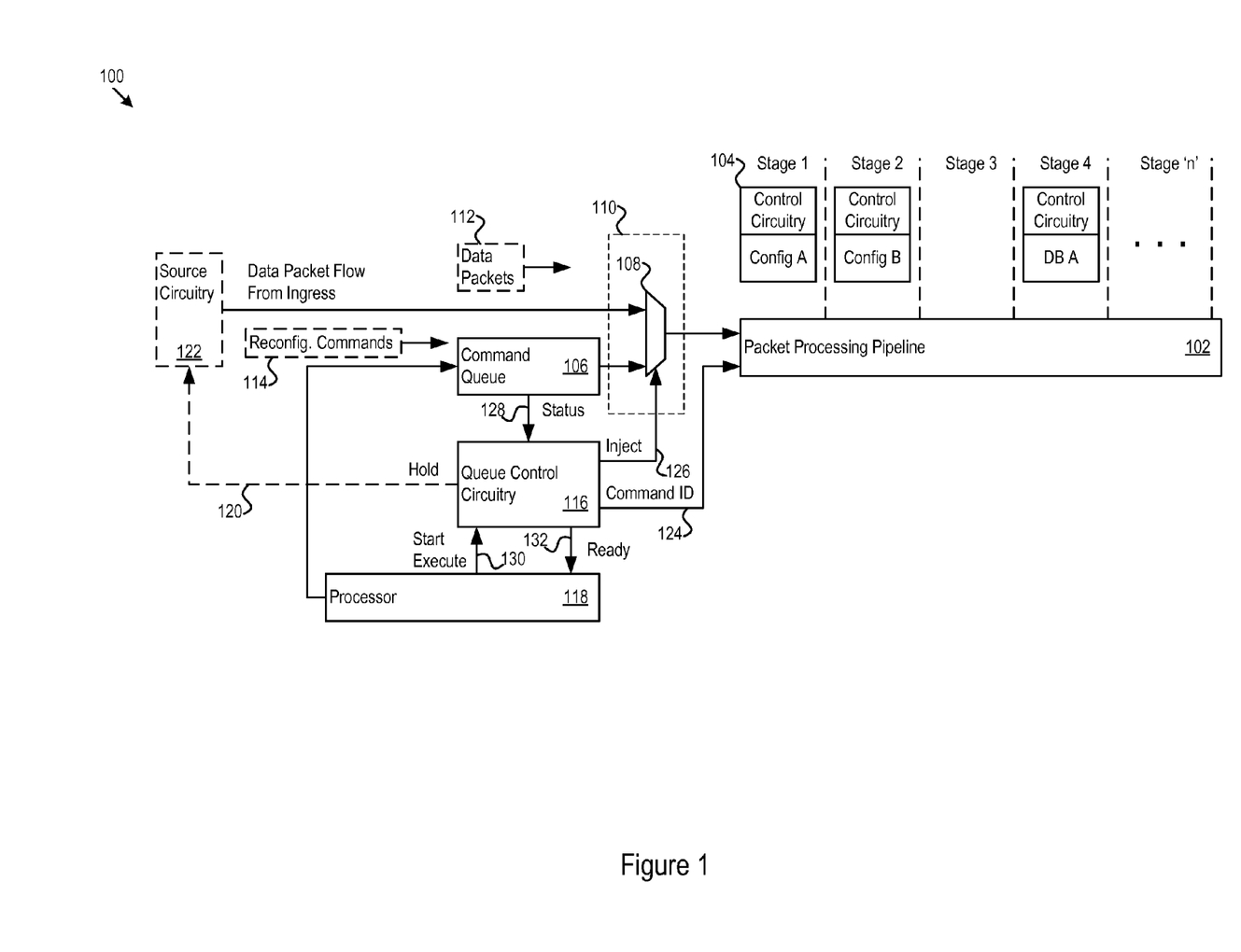
FIG. 1 shows an example of a pipeline configuration command processing system.
Figure 2:
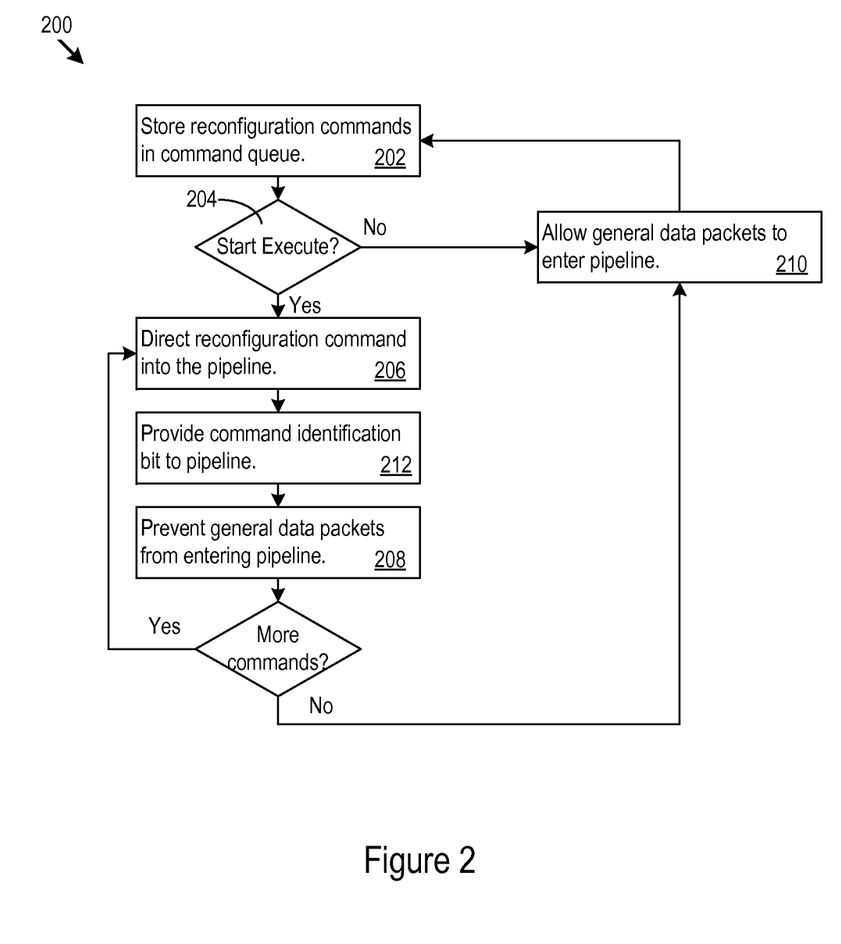
FIG. 2 shows a flow diagram of command processing logic that a command processing system may implement.

FIG. 1 shows an example of a pipeline configuration command processing system 100 ("system 100"). FIG. 2 shows a corresponding logic flow diagram for the system 100. The system 100 includes a packet processing pipeline 102 ("pipeline 102") configured to process data packets. The pipeline 102 may be implemented as a sequence of any number of stages, e.g., stage 1, stage 2, ... to stage 'n'. Any of the stages may include configuration registers, memories, databases, or other configuration elements. The configuration elements may be implemented as SRAM, DRAM, or Flash memory, as examples. The stages may also include control circuitry (e.g., the control circuitry 104), such as a memory controller, to control reads and writes to the configuration elements. In the example shown in FIG. 1, stage 1 includes the configuration element A, stage 2 includes the configuration element B, and stage 4 includes the database A.

The configuration elements provide, e.g., configuration values and parameters that the pipeline 102 may reference for processing the packets at any given stage as the packets travel down the pipeline 102. One goal of the system 100 is to facilitate atomic configuration of the configuration elements at multiple stages, so that a particular packet does not reference, e.g., a new value for configuration element A at stage 1, but an old value for configuration element B at stage 2.

The system 100 includes a command queue 106 in communication with the pipeline 102 through a selection element 108, e.g., a multiplexer. The command queue 106 may be a memory such as a First In First Out (FIFO) memory. The processor 118 stores configuration commands in the command queue (202). The selection element 108 is one example of a pipeline interface 110 that selectively delivers general purpose data packets 112 ("data packets 112") and configuration commands 114 to the pipeline 102. The queue control circuitry 116 is in communication with the command queue 106 and the pipeline interface 110. Note that the configuration commands 114 may themselves be implemented as data packets, but that the configuration commands 114 specify configuration changes to the pipeline 102 according to a predefined packet format, and cause configuration changes when interpreted by the pipeline 102 as configuration commands (e.g., in response to the command packet identification output 124).

The queue control circuitry 116 may control whether data packets 112 or configuration commands 114 enter the pipeline 102. The configuration commands 114 may be implemented as a particular type of data packet that specifies changes to the configuration elements, as described in more detail below. In that regard, when the processor 118 instructs the queue control circuitry 116 to execute configuration (204), the queue control circuitry 116 initiates configuration of the pipeline 102 by directing the configuration commands 114 through the pipeline interface 110 and into the pipeline 102 (206). The queue control circuitry 116 also prevents data packets from flowing into the pipeline 102 (208). In one implementation, the queue control circuitry 116 asserts a 'hold' signal 120 to source circuitry 122 that provides the data packets 112. The source circuitry 122 may be, for instance, ingress circuitry that receives data packets on network ports in a switch device. However, the pipeline 102 may be used in any other context in any other device that processes data.

The source circuitry 122 responds to the 'hold' signal 120 by, e.g., pausing the flow of data packets 112 toward the pipeline 102. When the queue control circuitry releases the 'hold' signal 120 (e.g., when all of the configuration commands have entered the pipeline 102), data packets 112 again flow toward the pipeline 102 (210). The 'hold' signal 120 may be a control line, a message sent to the source circuitry 122, or another type of control mechanism to controllably start and stop data packet flow.

The queue control circuitry 116 may include a command packet identification output 124 in communication with the pipeline 102. The command packet identification output 124 indicates whether the current packet entering the pipeline 102 is a pipeline configuration command or a data packet (212). In that regard, the pipeline 102 may be configured to accept a command identification bit from the command packet identification output 124 that distinguishes whether a data packet 112 or a configuration command 114 is entering the pipeline 102. The pipeline 102 may propagate the command identification bit (or other indicia provided by the command packet identification output 124) down the pipeline with the packet to which the flag pertains, so that each stage of the pipeline 102 may identify the packet type with reference to the command identification bit.

The queue control circuitry 116 may also include a command injection output 126. The command injection output 126 is configured to control whether the data packets 112 or the configuration commands 114 pass through the pipeline interface 110. The selection element 108 is responsive to the command injection output 126 to pass either configuration commands 114 or data packets 112. The queue control circuitry 116 may also provide a command queue status output 128 configured to indicate how many pipeline configuration commands are in the command queue 106, or, as another example, whether the command queue 106 is empty or not empty. The queue control circuitry 116 may provide a 'ready' output 132 configured to indicate whether the queue control circuitry 116 is busy injecting configuration commands into the pipeline 102, or is idle, and ready to begin injecting configuration commands into the pipeline 102. The queue control circuitry 116 may de-assert the 'ready' output 132 when it begins directing the configuration commands from the command queue 106 into the pipeline 102, and assert the 'ready' output 132 when all of the configuration commands from the command queue have entered the pipeline 102.

The processor 118 may provide the configuration commands 114. The processor 118 may also direct the queue control circuitry 116 to start configuration of the pipeline 102. In that regard, the queue control circuitry 116 may include a 'start execute' input 130 that the processor 118 may assert to direct the queue control circuitry 116 to inject the configuration commands 114 into the pipeline 102, instead of the data packets 112. The queue control circuitry 116 may do so by controlling the command injection output 126 to direct the selection element 108 to pass configuration commands 114 instead of the data packets 112.

In one implementation, the configuration commands 114 are packets that meet a specific format. Table 1 provides one example of many different possible implementations for the structure of the configuration command.

TABLE 1

Example Configuration Command Format

| Field | Size | Bits | Description |
|---|---|---|---|
| Address | 32 b | 31:0 | The full address to write the data. |
| Data | 992 b | 1023:32 | The data to write to the register/memory |

The configuration commands flow through the pipeline 102 and cause changes to the memories that constitute the configuration elements. Configuration commands enter the pipeline 102 as special types of packets, and for each configuration command, the command packet identification output 124 set. A configuration command passes through the pipeline 102 like the data packets 112, but causes particular behavior with regard to the configuration elements. In particular, when the configuration command arrives at each pipeline stage, the associated set of control circuitry 104 may compare the address field in the configuration command to determine whether the configuration command addresses the particular configuration element in that pipeline stage. If so, the control circuitry writes the data specified by the configuration command to the specified address, thereby changing the configuration element value. The command identification bit flags for the control circuitry whether to treat the current packet as a configuration command packet.

In some implementations, the pipeline 102 sends the configuration command to each memory in the pipeline. The control circuitry associated with each memory may individually check the address information in the configuration command. When the address information specifies a configuration element that the control circuitry is responsible for handling, the control circuitry writes the data specified by the configuration command to the configuration element. Otherwise, the control circuitry takes no action, and the configuration command is effectively filtered out.

Note that data packets 112 are held while configuration commands flow through the pipeline. Accordingly, the processor 118 may make any number of changes to the configuration elements, by adding a corresponding number of configuration commands to the command queue 106, and then directing the queue control circuitry 116 to inject the configuration commands in sequence into the pipeline 102. After the last configuration command has entered the pipeline 102, the queue control circuitry 116 may allow data packets 112 to once again enter the pipeline 102.

The processor 118 may provide the configuration commands, e.g., in response to console commands described below. Data packets may arrive from virtually any source for processing in the pipeline 102. For instance, the pipeline 102 may be part of a packet switch, with ingress circuitry receiving the data packets at input ports, and directing them towards the pipeline 102 for processing.

Figure 3:
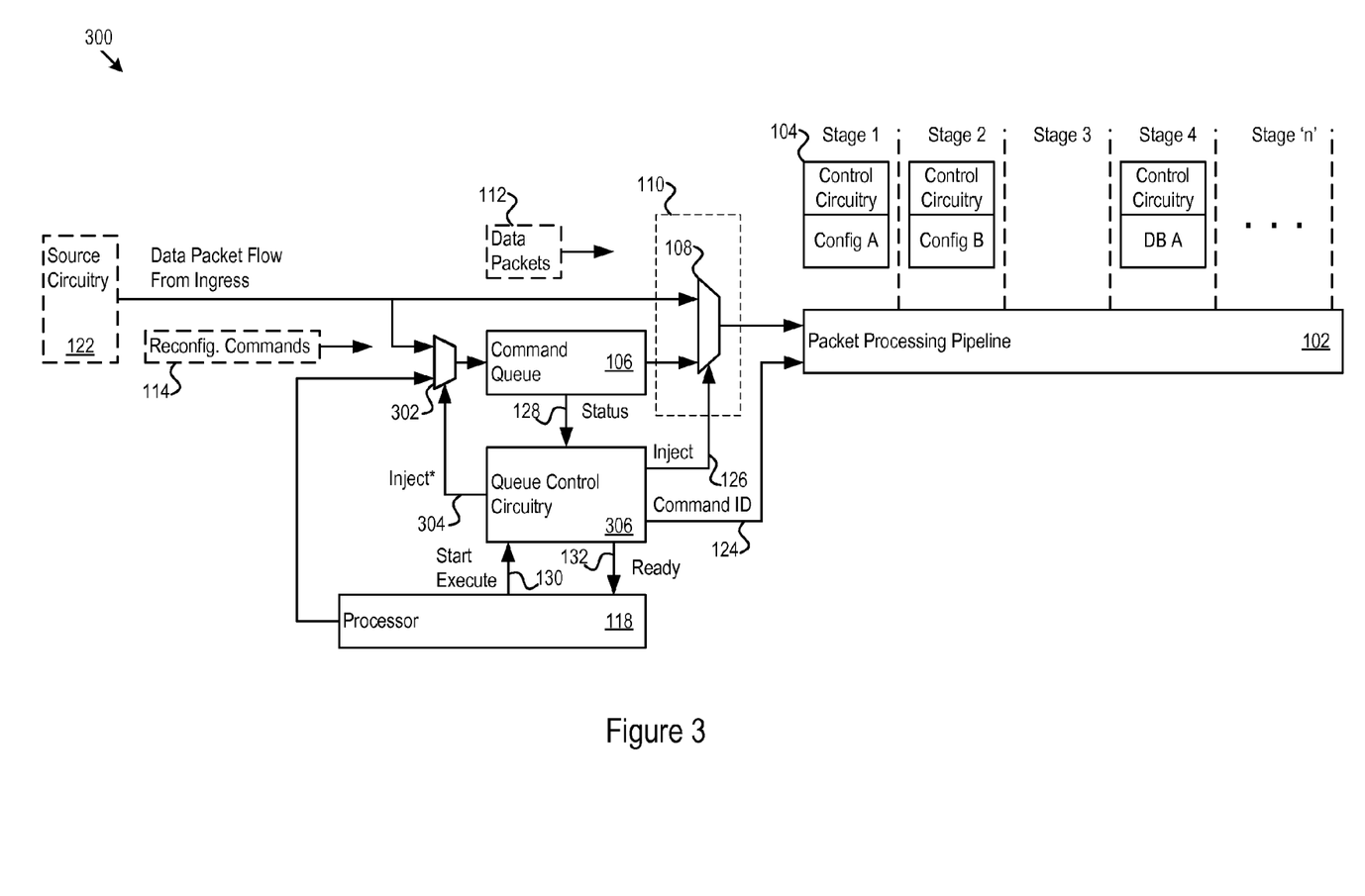
FIG. 3 shows another example of a pipeline configuration command processing system.
Figure 4:
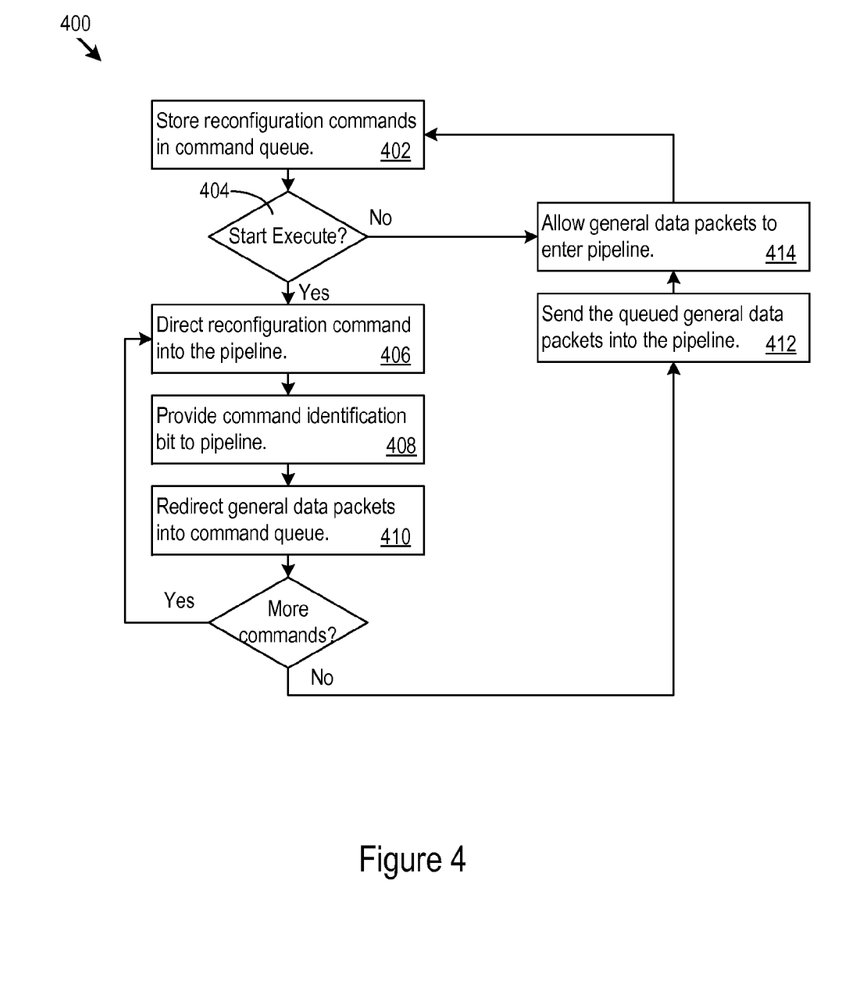
FIG. 4 shows a flow diagram of command processing logic that a command processing system may implement.

FIG. 3 shows another example of a pipeline configuration command processing system 300 ("system 300"). FIG. 4 shows a corresponding logic flow diagram for the system 300. In the system 300, a command queue input selector 302 determines whether configuration commands 114 or data packets 112 enter the command queue 106. The queue control circuitry 306 may control both the selection element 108 and the command queue input selector 302 using the command injection output 126 and its complement 304, as one example.

When data packets 112 are entering the pipeline 102, the queue control circuitry 306 directs the configuration commands 114 into the command queue 106 (402). The queue control circuitry 306 initiates configuration of the pipeline 102 (404) by directing the pipeline configuration commands into the pipeline 102 (406), and also provides the command identification indicator to the pipeline 102 (408). In that regard, the queue control circuitry 306 also redirects data packets 112 bound for the pipeline 102 into the command queue 106 (410). Once the configuration commands have entered the pipeline 102, the queue control circuitry 306 sends the queued data packets into the pipeline 102 (412), and allows subsequent data packets to also enter the pipeline 102 (414).

In one implementation, a finite state machine implements the queue control circuitry 116 or 306. For instance, the queue control circuitry 306 may implement the following states, outputs, and transitions:

Idle-Stage:
There are no configuration commands. The pipeline 102 is fed directly from the source circuitry 122 and the command queue 106 is empty. Outputs: command identification=0; Inject=0; Ready=1.

Configuration Command-Preparation:
The processor 118 pushes to the command queue 106 all the configuration commands to be sent, sequentially. There is no change in outputs.

Configuration Command-Injection:
The processor 118 asserts the 'start execute' input 130 and the injection of configuration commands starts. During injection, the pipeline 102 is fed from the command queue 106, with the command identification flag set. Data packets that arrive from the source circuitry 122 during the injection of configuration commands will redirect to the command queue 106. Outputs: command identification=1; Inject=1; Ready=0.

Packet-Injection:

Once all configuration commands are injected into the pipeline 102, the output command identification is reset, and command queue 106 continues to send the data packets 112 that were redirected to the command queue 106. Outputs: Is-applet=0; Inject=1; Ready=0. When all packets are redirected and the command queue 106 is empty, injection is done and the finite state machine returns to the idle-stage.

Note that the pipeline 102 may operate at a faster rate than the incoming packet rate. As a result, from time to time there may be bubbles in the pipeline 102 due to unused, open packet slots. The frequency of the open slots depends on the relative processing rate and packet reception rate. As just one example the open slots may occur approximately every 300 packets. For each open slot, the queue control circuitry 116 may inject a packet from the command queue 106 into the pipeline 102, and as noted above that packet may be a queued data packet 112. Accordingly, by injecting a packet from the command queue 106 when there would otherwise be an open slot, the queue control circuitry may, over time, empty the command queue 106.

Note that packets with the command identification bit set may be dropped when they reach the end of the pipeline.

Figure 5:
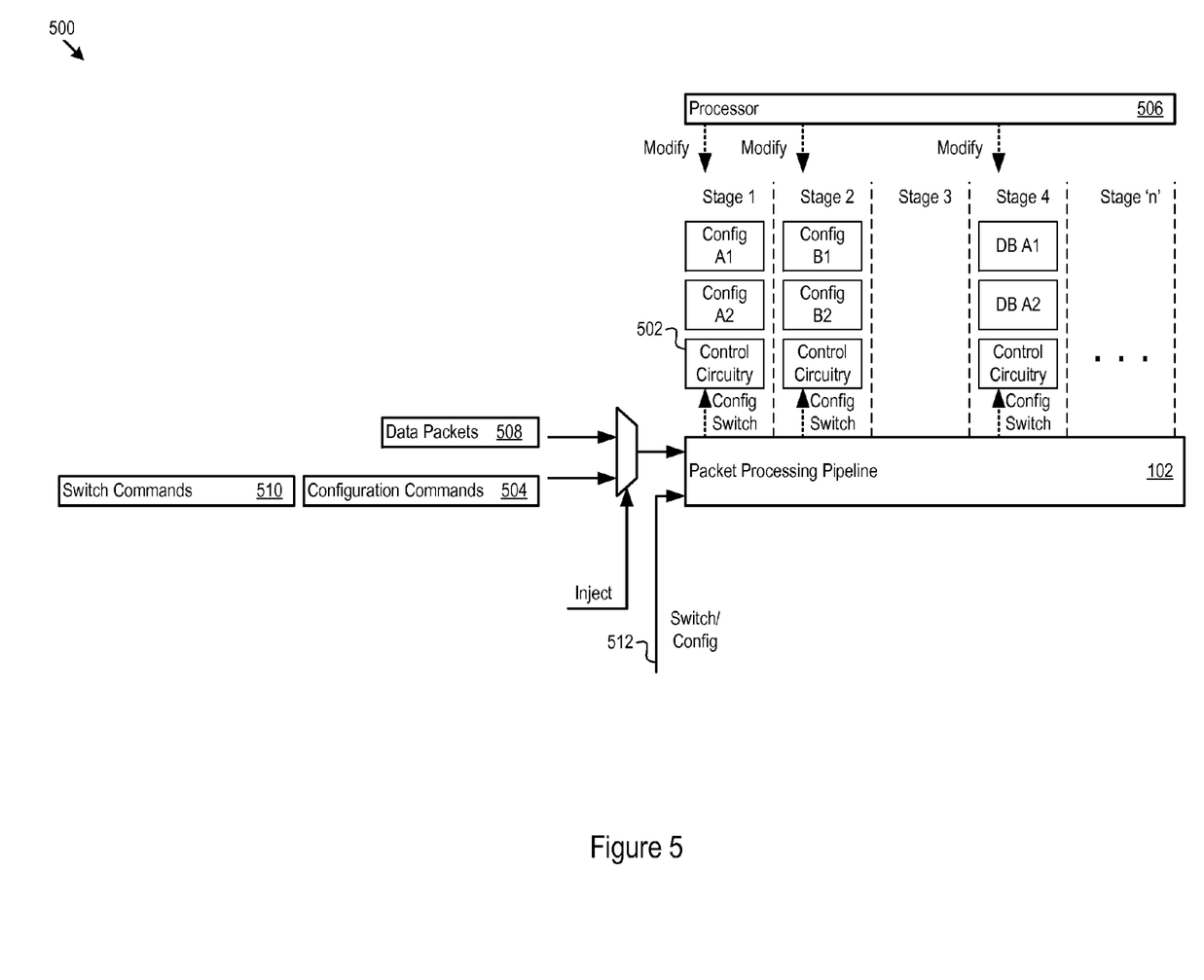
FIG. 5 shows another example of a pipeline configuration command processing system.

FIG. 5 shows another example of a pipeline configuration command processing system 500 ("system 500"). In the system 500, the pipeline 102 includes multiple (e.g., 2) sets of configuration elements in each pipeline stage. For instance, stage 1 has memory elements that store a configuration A1 and a configuration A2. Each stage includes control circuitry, e.g., the control circuitry 502, for the configuration elements.

The pipeline 102 may support setting the configuration elements in different ways. For example, the pipeline 102 may process configuration commands 504 in the manner described above to set values in the configurations. As another example a processor 506 or other control circuitry may write values to the configuration elements, or may direct the control circuitry to do so.

The system 500 prepares for a new configuration changeover by writing new configuration values to a particular set of the configuration elements in each stage, e.g., as a set of shadow memories. The data packets 508 flow through the pipeline 102, which applies the currently active set of configuration elements to the packets. When the pipeline 102 is directed to switch to a new configuration, the shadow memories become the active memories, and the currently active memories become the shadow memories where new values are written. Using this approach allows the configuration commands 504, processor 506, or other circuitry to prepare the shadow memories in an atomic manner for the switch, because the packets in the pipeline are not processed according to the values in the shadow memories.

In the example shown in FIG. 5, the pipeline 102 receives switch commands 510. The switch commands 510 may have a specific pre-defined format. When each stage receives the switch command, control circuitry in each stage may switch the currently active configuration, and each stage changes in sequence as the switch command flows down the pipeline 102. Each data packet following the switch command therefore accesses the new configuration values applicable for processing that packet. Note that a switch flag input 512 to the pipeline may identify a switch command to the control circuitry in the same way that the command identification input flags a configuration command as described above.

Figure 6:
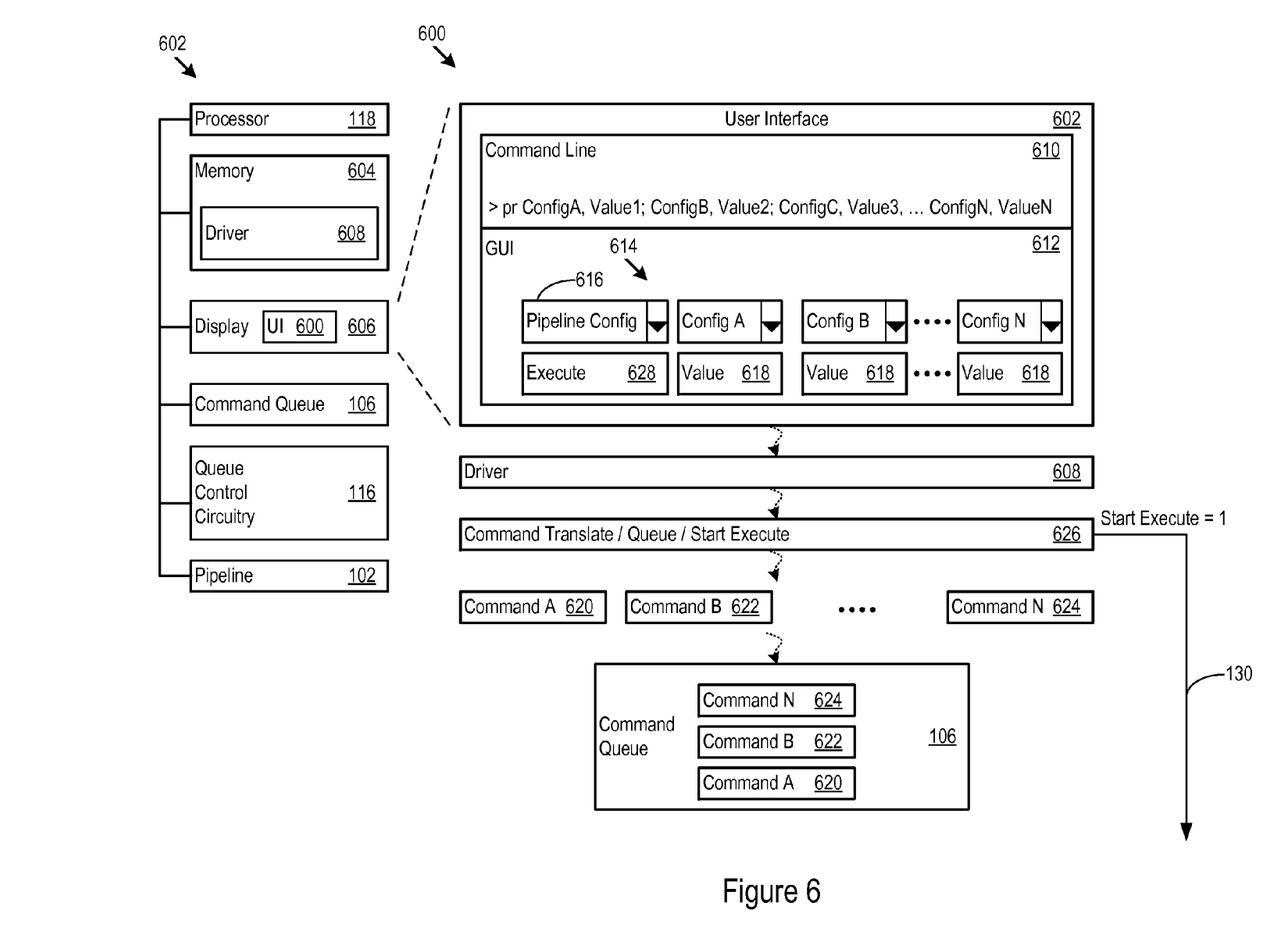
FIG. 6 shows an example of a user interface for facilitating pipeline configuration.

FIG. 6 shows an example of a user interface 600 for facilitating pipeline configuration. A processing system 602 may implement the user interface 600. As examples, the user interface may be part of the same device (e.g., a networking switch) as the pipeline 102, or it may be remote from the pipeline 102, e.g., in a separate network connected control device that sends instructions to a device that includes the command queue 106, queue control circuitry 116, and the pipeline 102.

The processing system 602 includes a processor (e.g., the processor 118), a memory 604, and a display 606. The display may present the user interface (UI) 600. The memory 604 may store, for execution by the processor 118, an operating system, utility applications, and other programs. In particular, the memory 604 may store one or more drivers 608.

The drivers 608 may process instructions entered into the user interface 600 for configuring the pipeline 102. FIG. 6 shows an example of a command line interface 610 and a graphical user interface (GUI) 612. In the command line interface, an operator may enter a command to reconfigure the pipeline 102. The command may take on a wide variety of implementations, and the example shown is "pr ConfigA, Value1; ConfigB, Value2; ConfigC, Value3, . . . ConfigN, ValueN" The 'pr' command specifies the configuration elements to modify, and the value to write to the configuration element. Multiple configuration element/value pairs are separated by semicolons.

In the GUI 612, drop down boxes 614 provide a selection of commands, and when the command is a pipeline configuration command 616, facilitate selection of multiple configuration elements. The corresponding values may be entered in the text boxes 618, for instance. An 'execute' button 628 may be provided to cause the processing system 602 to carry out the configuration. The GUI may be implemented in many other ways using many different graphical user interface elements.

The driver 608 interprets the reconfiguration commands from the UI 600, whether entered in the command line interface 610 or in the GUI 612. The driver 608 performs translation of the UI commands into reconfiguration commands (e.g., the configuration commands 620, 622, and 624), and directs the queue control circuitry 116 to begin execution 626. As a specific example, assume the command "pr A, 100; C, 717; R, 1856" was entered. The driver 608 may then generate three configuration commands, one to set the value 100 for configuration element A, one to set the value 717 for configuration element C, and one to set the value 1856 for configuration element R. The driver 608 may then write each configuration command into the command queue 106, e.g., by writing values to a specific memory address or register set for the command queue 106. Before doing so, the driver 608 wait up to a predetermined amount of time until the 'ready' output 132 is active, e.g., by reading a memory location or register value that captures the state of the 'ready' output 132. After the driver 608 writes the configuration commands to the command queue 106, the driver 608 may then cause the 'start execute' input 130 to go active, e.g., by writing a non-zero value to a specific memory address or register. The queue control circuitry 116 may then proceed as noted above to send the configuration commands through the pipeline 102, while pausing or buffering data packets 112.

Some implementations may include duplicated configuration elements that provide shadow configuration elements. The driver 608 may then create the configuration commands to address the currently inactive set of configuration elements, add the configuration command to the command queue 106, and cause the queue control circuitry 116 to propagate the configuration commands down the pipeline 102. When the operator instructs the processing system 602 to execute the configuration change, the driver 608 may then prepare and write a switch command to the command queue 106. The driver 608 then causes the queue control circuitry to begin execution to make the switch command flow down the pipeline 102.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
a packet processing pipeline configured to process data packets;
a command queue in communication with the packet processing pipeline; and
queue control circuitry in communication with the command queue and the packet processing pipeline, the queue control circuitry configured to:
direct pipeline configuration commands into the command queue; and initiate configuration of the packet processing pipeline by:
directing the pipeline configuration commands into the packet processing pipeline; and
redirecting data packets bound for the packet processing pipeline into the command queue until the pipeline configuration commands have entered the packet processing pipeline.

2. The system of claim 1, where the queue control circuitry comprises:
a command packet identification output in communication with the packet processing pipeline.

3. The system of claim 2, where the packet processing pipeline is configured to accept a command identification bit from the command packet identification output, and propagate the command identification bit down the packet processing pipeline.

4. The system of claim 1, where the queue control circuitry comprises:
a command injection output configured to indicate when to direct the pipeline configuration commands into the command queue.

5. The system of claim 4, further comprising:
selection logic responsive to the command injection output by directing the pipeline configuration commands into the command queue.

6. The system of claim 1, where the queue control circuitry comprises:
a command injection output configured to indicate when to redirect the data packets into the command queue.

7. The system of claim 6, further comprising:
selection logic responsive to the command injection output by redirecting the data packets into the command queue.

8. The system of claim 1, where the command queue further comprises:
a command queue status output configured to indicate how many pipeline configuration commands are in the command queue.

9. The system of claim 1, where the queue control circuitry further comprises:
a 'start execution' input configured to direct the queue control circuitry to inject the pipeline configuration commands into the packet processing pipeline, instead of the data packets.

10. The system of claim 9, where the queue control circuitry further comprises:
a 'ready' output configured to indicate when additional pipeline configuration commands may be written to the command queue.

11. A system comprising:
a pipeline interface to a packet processing pipeline;
a command queue in communication with the pipeline interface; and
queue control circuitry in communication with the command queue and the pipeline interface, the queue control circuitry configured to:
direct pipeline configuration commands into the command queue; and initiate configuration of the packet processing pipeline by:
directing the pipeline configuration commands through the pipeline interface and into the packet processing pipeline; and assert a hold signal to ingress logic, the hold signal configured to pause data packets flowing from the ingress logic through the pipeline interface into the packet processing pipeline.

12. The system of claim 11, where the queue control circuitry comprises:
a command packet identification output in communication with the packet processing pipeline.

13. The system of claim 12, where the pipeline is configured to accept a command identification bit from the command packet identification output that indicates whether a data packet or a pipeline configuration command is entering the packet processing pipeline.

14. The system of claim 11, where the queue control circuitry comprises:
a command injection output configured to indicate whether the data packets or the pipeline configuration commands pass through the pipeline interface.

15. The system of claim 14, further comprising:
selection logic responsive to the command injection output.

16. The system of claim 11, where the command queue further comprises:
a command queue status output configured to indicate how many pipeline configuration commands are in the command queue.

17. The system of claim 11, where the queue control circuitry further comprises:
a 'start execution' input configured to direct the queue control circuitry to inject the pipeline configuration commands into the packet processing pipeline, instead of the data packets.

18. The system of claim 17, where the queue control circuitry further comprises:
a 'ready' output configured to indicate when additional pipeline configuration commands may be written to the command queue.

19. A system comprising:
a pipeline interface to a packet processing pipeline;
a command queue in communication with the pipeline interface; a data packet input;
a pipeline configuration command input;
queue selection circuitry configured to select between the data packet input and the pipeline configuration command input for passing into the command queue;
entry selection circuitry configured to select between the data packet input and the command queue for passing through the pipeline interface into the packet processing pipeline; and
queue control circuitry in communication with the command queue and the pipeline interface, the queue control circuitry configured to:
initiate configuration of the packet processing pipeline by:
directing the entry selection circuitry to pass pipeline configuration commands provided on the pipeline configuration command input from the command queue through the pipeline interface and into the packet processing pipeline;
assert a hold signal to ingress logic, the hold signal configured to pause data packets flowing from the ingress logic through the pipeline interface into the packet processing pipeline; and
when the command queue is empty, de-assert the hold signal and direct the entry selection circuitry to pass data packets provided on the data packet input through the pipeline interface and into the packet processing pipeline.

20. The system of claim 19, where the queue control circuitry further comprises:
a command packet identification output in communication with the pipeline interface, where the pipeline interface is configured to accept a command identification bit from the command packet identification output, and provide the command identification bit to the packet processing pipeline.

* * * * *